(12) United States Patent
Ozanich (10) Patent No.: US 7,731,297 B1
(45) Date of Patent: Jun. 8, 2010

(54) TAILGATE-SECURING DUMP APRON FOR DUMP TRUCKS

(76) Inventor: Anthony R. Ozanich, P.O. Box 7, Engadine, MI (US) 49827

( * ) Notice: Subject to any disclaimer, the term of this patent is extended or adjusted under 35 U.S.C. 154(b) by 418 days.

(21) Appl. No.: 11/766,163

(22) Filed: Jun. 21, 2007

(51) Int. Cl.
*B62D 33/02* (2006.01)
(52) U.S. Cl. ..................................... 298/7; 298/23 MD
(58) Field of Classification Search ............... 298/7, 298/23 R, 23 MD, 23 D; 222/108, 528, 531; 296/51, 56, 58, 61; 193/4–6, 17
See application file for complete search history.

(56) References Cited

U.S. PATENT DOCUMENTS

| 836,102 | A | * | 11/1906 | Dunham | |
|---|---|---|---|---|---|
| 1,735,930 | A | | 11/1929 | Miller | |
| 2,248,374 | A | | 7/1941 | Mitchell | |
| 3,366,418 | A | * | 1/1968 | Lackey | 298/7 |
| 4,723,817 | A | | 2/1988 | Wallan | |
| 5,174,632 | A | | 12/1992 | Hagenbuch et al. | |

OTHER PUBLICATIONS

NBC Truck Equipment, Inc., Dump Truck Bodies, archived web catalog, Aug. 2004, one page, www.nbctruckequip.com (via www.archive.org), U.S.

* cited by examiner

*Primary Examiner*—Stephen Gordon
(74) *Attorney, Agent, or Firm*—Northern Michigan Patent Law, PLC (57) ABSTRACT

A dump apron for a dump truck, the apron pivotally mounted around a lower end of the dump opening at the rear of the dump body, and movable in response to the tilt position of the dump body between a lower flow-channeling position and a raised tailgate-securing position. In the tailgate-securing position the apron serves to seal leaks of the loaded material around the tailgate, and to function as a secondary lock to back up the tailgate's primary latching or locking mechanism. In the preferred form, the apron is held at an acute angle to the closed tailgate in the raised tailgate-securing position, forming a trough for collecting particulate material leaking around the tailgate from the loaded dump bed, and allowing visual inspection of the lower end of the tailgate and the tailgate's primary lock.

8 Claims, 8 Drawing Sheets

TAILGATE-SECURING DUMP APRON FOR DUMP TRUCKS

BACKGROUND OF THE INVENTION

1. Field of the Invention

The invention relates to dump aprons for dump trucks.

2. Description of Related Art

End-dumping dump trucks that carry particulate material loads like gravel, sand, and crushed aggregate often "leak" gravel, etc. through spaces between the tailgate and the dump opening, either because the initial tolerances between the gate and the dump body floor and sidewalls are loose, or because initial tight tolerances are worn away over time by the abrasiveness of the material being carried.

Losing hard, abrasive materials like gravel out through the dump opening while traveling at road speeds can result in damage to vehicles traveling behind a loaded dump truck, can make a mess of the road, and can even result in significant material loss from the load being carried.

End-dumping dump trucks that carry particulate or aggregate materials are often provided with a stationary metal "apron" secured to the rear edges of the dump body, surrounding a lower portion of the dump opening. The apron is a generally U-shaped assembly of plate steel that extends rearwardly from the dump opening and tailgate to channel the flow of material away from the rear of the truck and to limit side spill while the material is being dumped, for example while dumping gravel for a roadbed. In addition to material that might leak around the closed tailgate, some materials tend to stick to the apron after the dumping operation is over, and this material can bounce or be blown off the apron while the dump truck is traveling.

A potentially more serious problem in terms of losing material out through the tailgate is failure of the tailgate locking mechanism, due to mechanical failure or driver error.

SUMMARY OF THE INVENTION

According to the invention, a dump apron is pivotally mounted on the rear end of a dump body so that it can be raised to secure the tailgate against particulate leaks and/or against failure of the tailgate's primary locking mechanism when the tailgate is closed. In the preferred form the dump apron is raised and lowered by a powered actuator mechanism, such as an air cylinder, driven by a readily available power source on the dump truck. In a further preferred form, the actuator is coupled to the apron through an adjustable linkage that provides a mechanical advantage.

In a further aspect of the invention, the dump apron is automatically raised and lowered in response to the position of the dump body. When the dump body is horizontal on the truck frame, for example during transport of the loaded particulate material, the apron is automatically raised to its sealing/locking position. When the dump body is tilted to a dumping angle, the apron is automatically lowered to its extended, flow-channeling position. In a preferred form, the automatic actuation of the apron is triggered with a switch responsive to the tilting of the dump body.

In a further preferred form, the apron is maintained at an angle below vertical in its raised sealing/locking position, such that the apron is spaced at an acute angle from the substantially vertical tailgate and the dump opening. This allows the apron to collect a limited amount of leaking particulate material, which when it builds up in the raised, angled apron, functions as an effective seal to prevent further loss of material between the dump opening and the closed tailgate. In the preferred form, this angle is achieved by adding one or more stop members to the tailgate, the apron abutting the stop members in the apron's raised, tailgate-securing position. Where the apron's secondary lock function is the overriding concern, the stop members can be minimized or omitted so that the apron can be raised to an essentially vertical position against the closed tailgate.

These and other features and advantages of the invention will become apparent from the detailed description below, in light of the accompanying drawings.

DESCRIPTION OF THE PREFERRED EMBODIMENT

Figure 1:
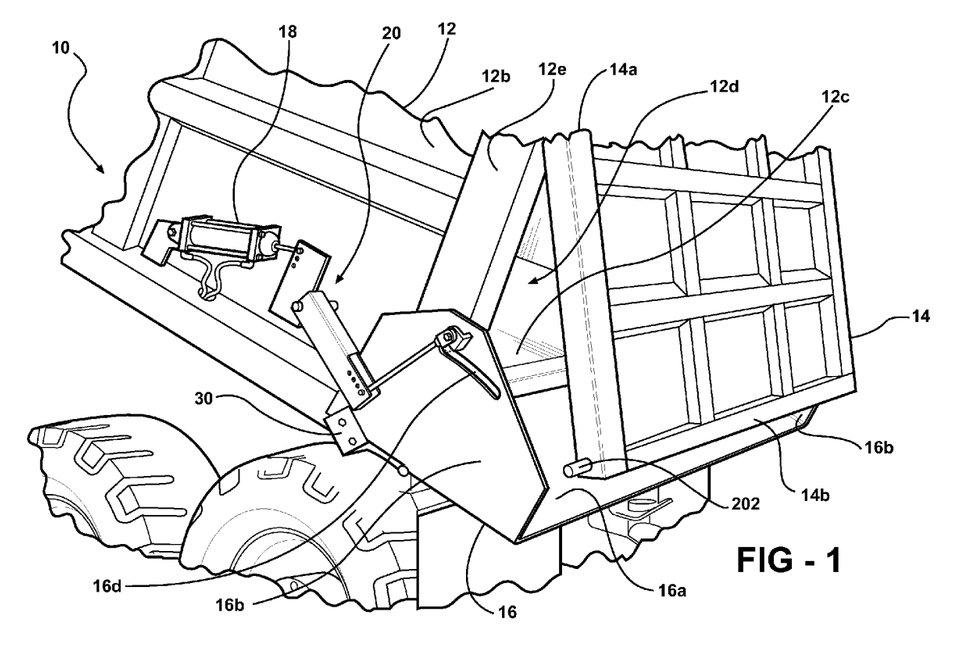
FIG. 1 is a perspective rear view of the tailgate area of a dump truck, with a dump apron according to the invention lowered to its flow-channeling position, and the dump body tilted for dumping.

FIG. 1 shows the rear portion of an end-dumping dump truck 10 with a container or "dump" body 12 and tailgate 14, of a type commonly used to haul and dump particulate materials such as gravel, sand, crushed aggregate, asphalt, salt, and others (hereafter "gravel") known to those skilled in the art. Dump body 12 is usually loaded with gravel (omitted for clarity in FIG. 1) via an open top, the gravel prevented from spilling out the discharge or "dump" opening 12d with a tailgate 14. The dump opening 12d is defined by the rear ends of the dump body sidewalls 12b and floor or bed 12c. Tailgate 14 normally closes dump opening 12d, but is activated by gravity or powered means as dump body 12 is tilted to pivot at its upper end 14a and swing open at lower end 14b, allowing the gravel to pour out through dump opening 12d. Although a tilt-bed dump truck such as the example generally illustrated in FIG. 1 is the preferred platform for the present invention, it will be understood by those skilled in the art that the invention could be used with other container-style bodies that discharge the particulate material through one or more end openings closed by swinging or hinged gates, including conveyor-discharge and injection-discharge type trucks, and including both horizontally-hinged and vertically-hinged ("barn door" style) tailgates.

Dump truck 10 is equipped with a dump apron 16, secured to the dump body 12 around the lower portion of the discharge or "dump" opening 12d to channel the flow of gravel away from the back of the dump truck, and to prevent gravel from spilling off to either side of the target dumping area. Apron 16 by itself has a generally standard shape and size, having a flattened U-shape with a long, flat bottom 16a and shorter vertical sidewalls 16b. Apron 16 is preferably made from a material such as steel plate, although other suitable materials and combinations of materials will be known to those skilled in the art. Bottom 16a extends across the back of the dump body 12, at least as wide as dump bed 12c (and therefore coextensive with dump opening 12d), and sidewalls 16b extend up in a close fit with the exterior sides of the dump opening, in the illustrated embodiment in contact with the exterior sides of vertical beams 12e that define the rear of the dump body and frame the dump opening. Apron 16 accordingly surrounds the lower end of the dump opening on three sides, with a fit close enough to effectively form an extension of the sidewalls 12b and bed 12c.

Figure 2:
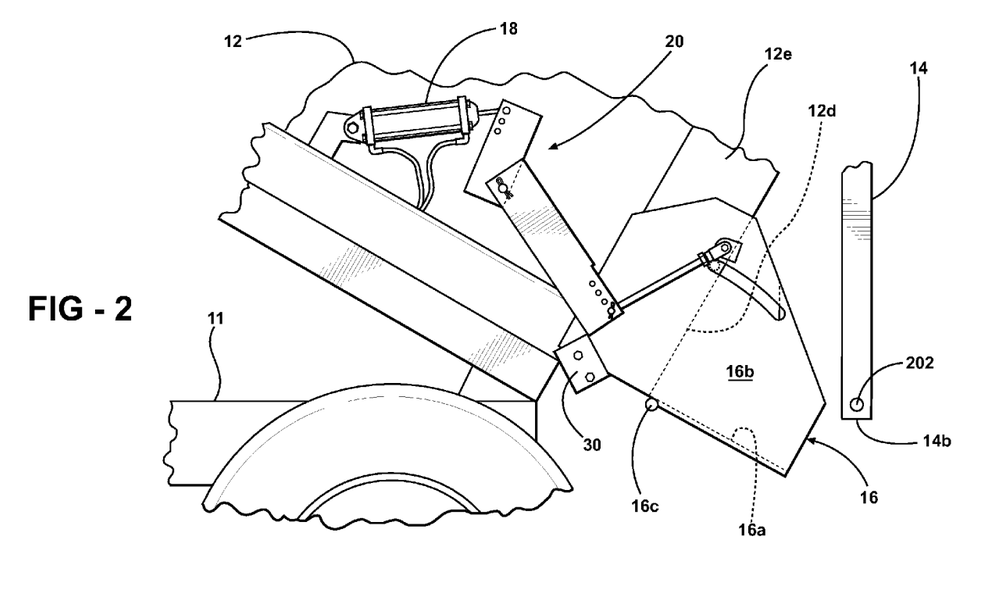
FIG. 2 is a side elevation view of the dump body and apron of FIG. 1, with the apron lowered to its flow-channeling position and the dump body tilted for dumping.

FIGS. 1 and 2 show dump body 12 tilted to a dumping position, and tailgate 14 swung open at its lower end 14b to allow gravel to pour out. Apron 16 is shown in a flow-channeling position common to prior fixed dump aprons, funneling the gravel out away from the taillights, hitch, tires and other portions of the rear end of the dump truck, and keeping side spill to a minimum. The depth of apron 16 can vary, depending on the size of the dump body and the material being dumped, but will generally average around 10-18 inches.

Figure 3:
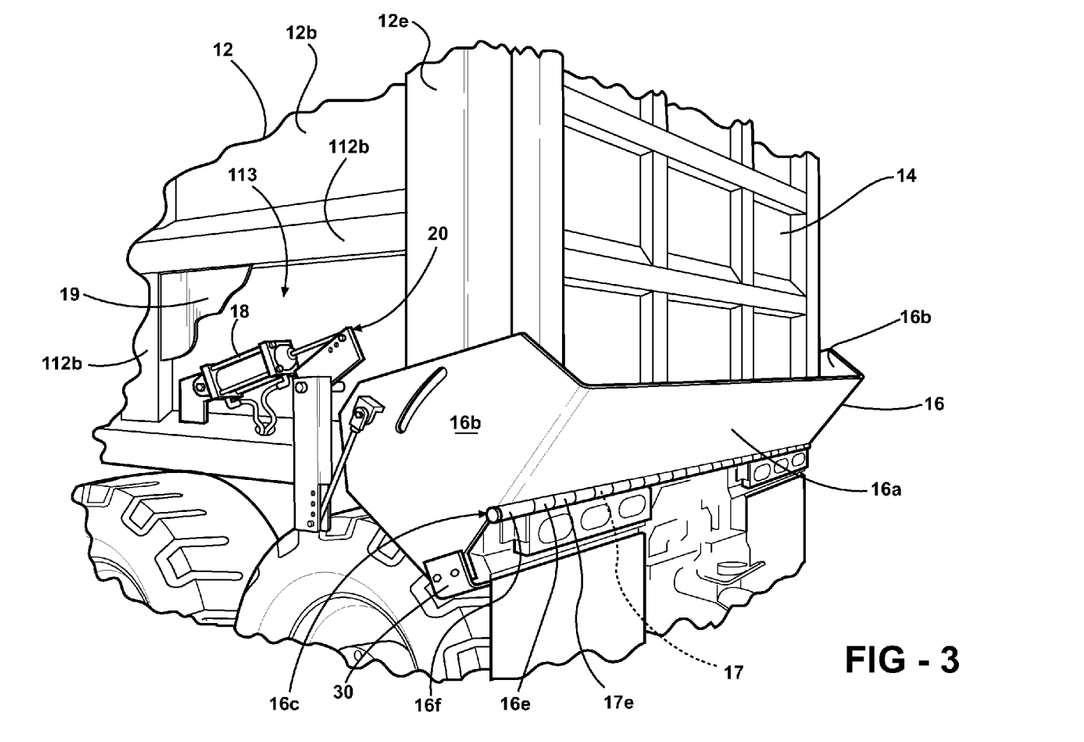
FIG. 3 is a perspective view of the apron and dump body of FIG. 1, with the dump body lowered to its horizontal transport position, the tailgate closed, the apron raised to its tailgate-securing position, and an actuator cover plate shown partially cut away.

Apron 16 according to the present invention is pivotally mounted on the dump body 12, at hinge 16c (FIG. 2), and operated by an actuator mechanism 18 through linkage 20 to be pivoted from the flow-channeling position of FIGS. 1 and 2 to a tailgate-securing position shown in FIG. 3.

Figure 3A:
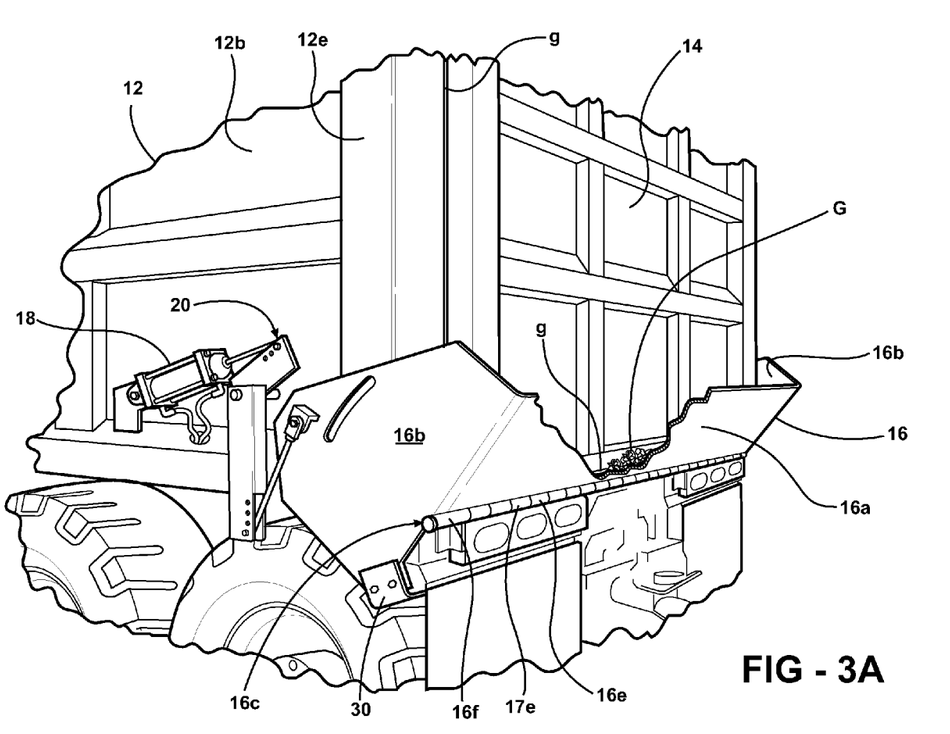
FIG. 3A is similar to FIG. 3, but with part of the apron cut away to show a leak-sealing buildup of particulate material adjacent the tailgate.
Figure 4:
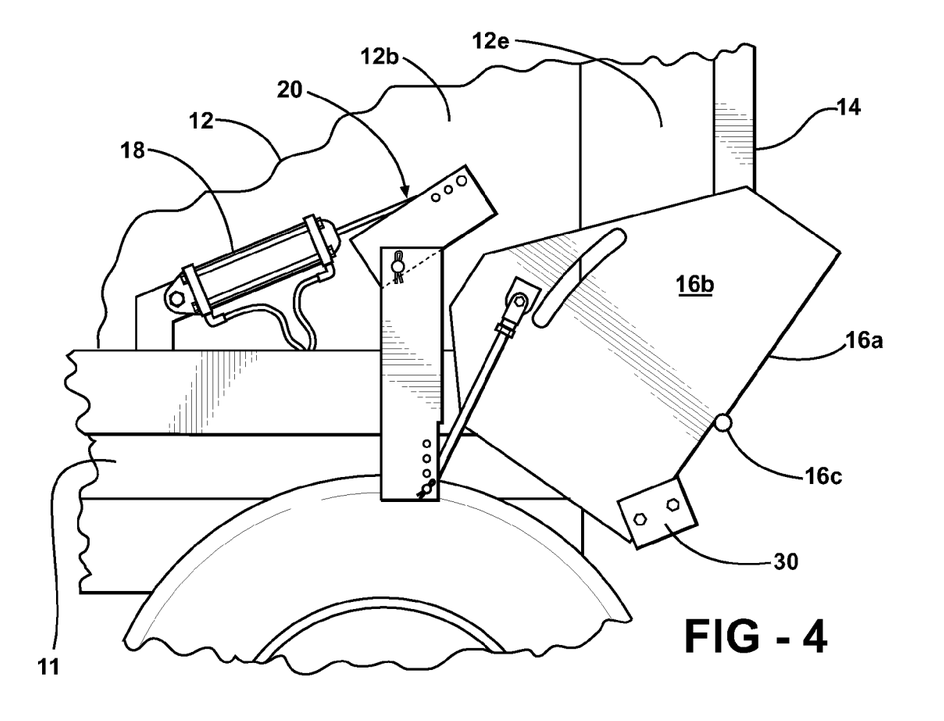
FIG. 4 is a side elevation view of the apron raised to the tailgate-securing position as the dump body returns to its transport position.
Figure 4A:
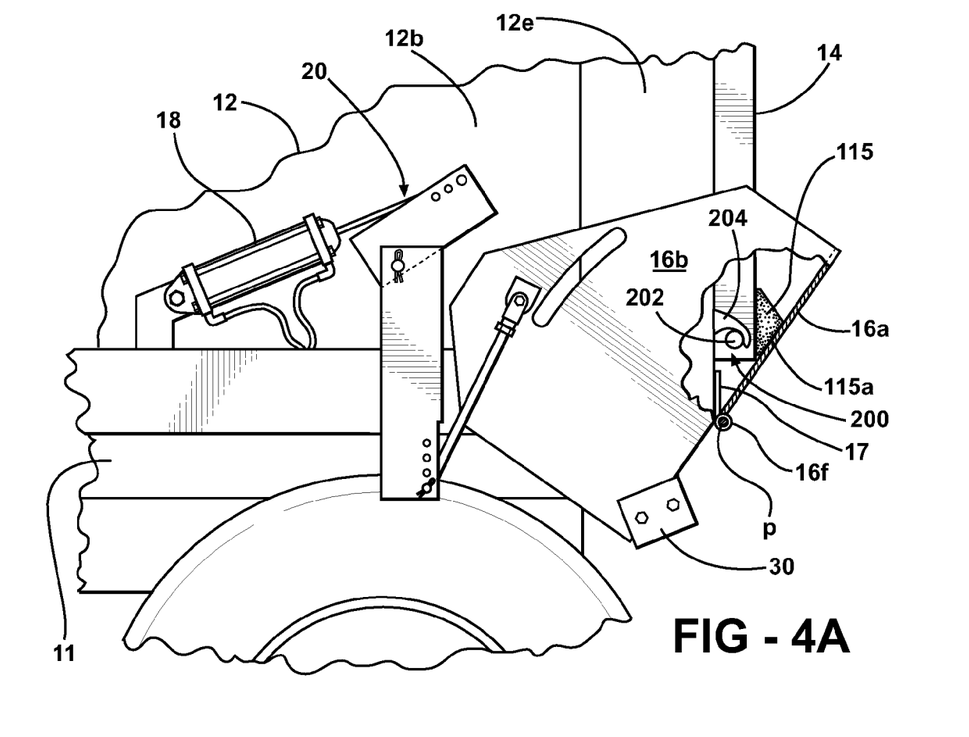
FIG. 4A is similar to FIG. 4, with a sidewall of the apron partially cut away to show contact between the apron's bottom wall and a stop member on the tailgate, and to show the apron's hinge connection to the truck.
Figure 5:
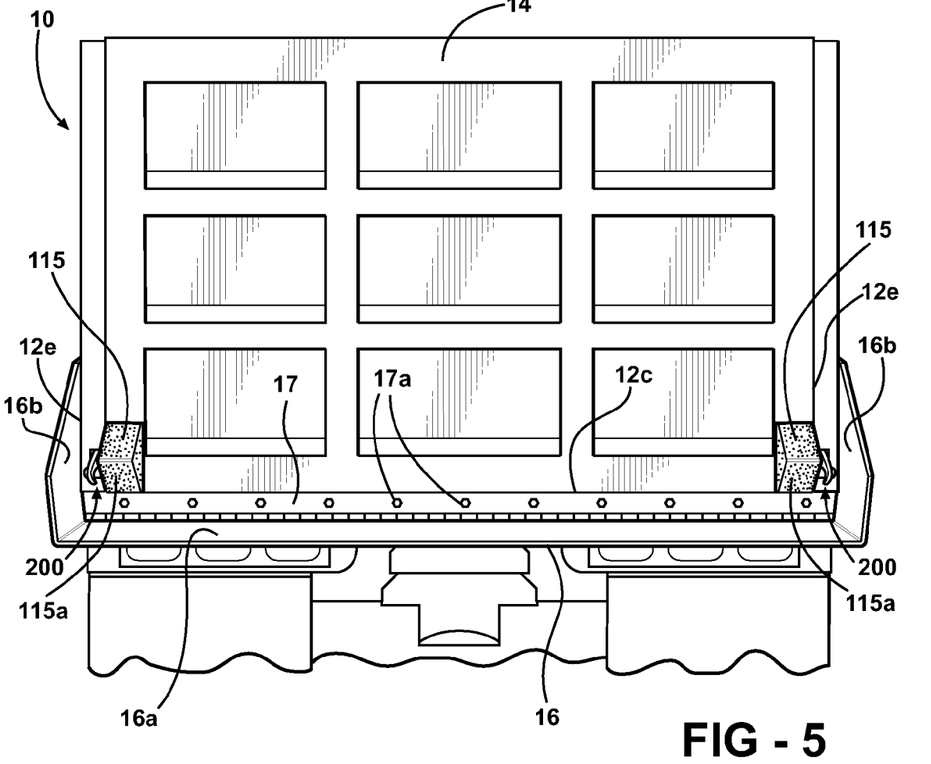
FIG. 5 is a rear elevation view of the dump body and apron of FIG. 1, showing the cross-wise shape of the apron and showing the stop members on the tailgate.

FIGS. 3 through 5 show dump body 12 returned to its substantially horizontal, non-dumping, transport position, with tailgate 14 accordingly swung closed. As best shown in FIGS. 4A and 5, the tailgate is typically latched or locked in known manner, for example as shown at 200 with latch pins 202 extending from each side of tailgate lower end 14b, the pins latched by hooks 204 operated by the truck driver either manually from the side of the truck, or with a powered actuator mechanism controlled from within the trucks' cab. The primary mechanism 200 for latching or locking the tailgate is not part of the present invention, and can vary.

Whatever the manner of securing the tailgate closed, there is the possibility that the primary lock 200 could fail, or that the dump truck driver could forget to engage the primary lock. Even when the tailgate is properly closed and locked, gaps g can often be found between the edges of closed tailgate 14 and the dump body sidewalls 12b and bed 12c, especially in older trucks. These gaps are usually due either to loose manufacturing tolerances or to wear, and gravel G (shown in FIG. 3A) is prone to leaking or spilling out through these gaps when the tailgate is closed. Apron 16 is raised to the position shown in FIGS. 3 and 4 to secure the tailgate by providing a backup to the primary tailgate lock, and/or to trap any leaking gravel and to seal gaps g with the buildup.

Still referring to FIGS. 3 through 5, apron hinge 16c is preferably a "piano" or other continuous-type hinge, the hinge connected at truck-side flange 17 to the dump body 12 below the tailgate and adjacent the outer edge of bed 12c. Rotating hinge sleeve portions 16e on the bottom of apron 16 are rotatably mated with fixed sleeve portions 17e extending from truck-mounted flange 17 with a hinge pin P (best seen in FIG. 4A), the hinge pin secured in place via a cylindrical end bushing 16f secured to one end of the apron 16, and with a similar bushing or a cross-pin on the other end of the apron. Hinge 16c runs the full width of dump bed 12c to help seal the junction of the bed and the apron throughout the apron's pivotal range of motion. The inner surfaces of the vertical apron sidewalls 16b maintain a sliding contact fit with the exterior of the sidewalls 12b (beams 12e in the illustrated embodiment) throughout the apron's pivotal range of motion, sealing apron 16 relative to the dump body sidewalls 12b. The sealing fit of apron 16 around the lower portion of the dump opening 12d, through which gravel pours out under the tailgate 14 when the dump body is tilted, makes the raised apron 16 an effective container for gravel leaking out through gaps g around the tailgate 14. While it might be possible to seal the apron 16 relative to dump body 12 using different pivoting connections, this is currently the preferred example. The sealing fit between apron 16 and dump body 12 need only be tight enough to contain most of the particulate material that is expected to leak out around the closed tailgate.

FIG. 3A shows the raised apron 16 containing a buildup of leaked gravel G, which, once it reaches a certain height and volume in the apron, will function to seal any gaps g around tailgate 14 through which it leaked. The angle of apron bottom 16a in the raised, tailgate-sealing position can vary, and can be vertical in essentially direct contact with the closed tailgate 14, but is preferably at an acute angle relative to the closed tailgate, in order to establish a containment volume or "trough" for the leaking gravel, and to allow visual inspection of the primary lock 200. The depth of apron bottom 16a can also vary according to the dump truck on which it is mounted, and according to the type of particulate material that can be expected to leak around the closed tailgate.

This self-sealing containment of the leaked gravel G using raised apron 16 as an angled trough has been found to be very effective. When the truck arrives at a dump site, lowering apron 16 and then tilting the dump bed 12 simply makes the leaked gravel the first of the load to be dumped; there is generally no need to clean the leaked gravel out of apron 16.

FIGS. 4A and 5 illustrate a preferred less-than-vertical angle for apron 16 to seal tailgate 14, and also to lock tailgate 14 as a backup for the primary lock 200. To ensure secondary locking contact between apron 16 and tailgate 14, one or more stop members such as 115 are welded, bolted, or otherwise firmly secured to the outer surface of tailgate 14, with apron-contacting faces 115a preferably angled to match the tailgate-sealing angle of apron bottom 16a. Apron bottom 16a abuts stops 115 in the tailgate-sealing position, firmly securing the tailgate against unwanted opening in case the dump truck operator fails to properly secure the tailgate with the primary lock, or in case the primary lock fails.

While the illustrated embodiment shows stops 115 as a pair of spaced steel blocks welded to tailgate 14, it will be understood that the number, spacing, material, shape, and manner of connecting stops 115 to the tailgate 14 can vary. Stops could also be applied to apron 16, but would tend to interfere with gravel flow.

Figure 6:
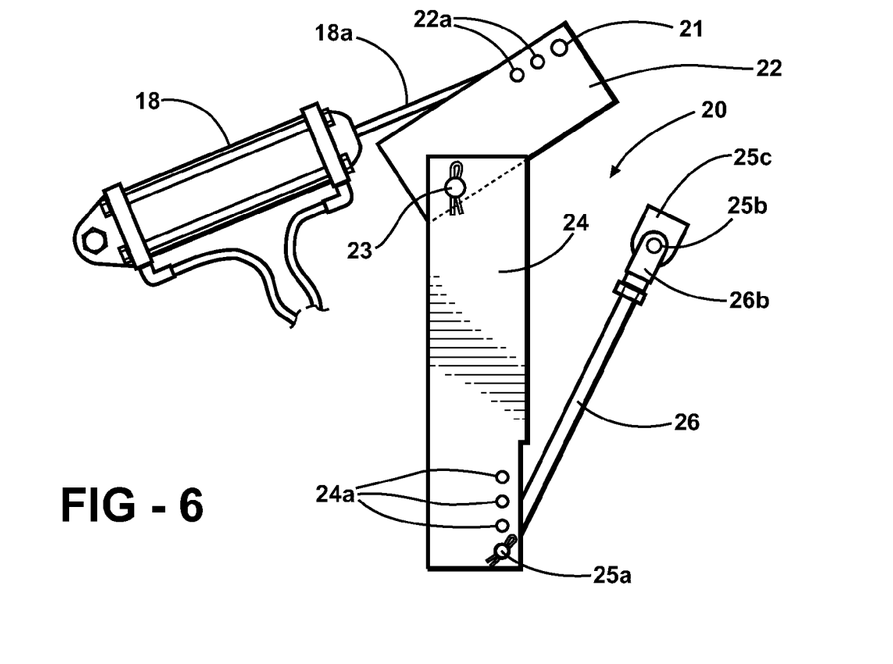
FIG. 6 is a detailed side elevation view of the apron's actuator mechanism illustrated in FIGS. 1 through 4.

Referring now to FIGS. 2, 4, and 6, apron 16 is pivoted on hinge 16c by air cylinders 18, operating through mechanical linkages 20. In the illustrated embodiment, an air cylinder 18 is mounted to the exterior of each dump body sidewall 12b, and is connected to a sidewall 16b of the apron through a corresponding linkage 20. It would be possible, although less robust, to pivot apron 16 using a single actuator 18 and linkage 20, and the actuator location and the pivot connection to the apron need not be limited to sidewall portions of the dump bed and apron, but the illustrated example is currently believed to be the best arrangement.

Air actuator cylinders 18 are of a known, commercially available type, with a reciprocally-driven shaft 18a moved by air pressure derived from the dump truck's existing air system, for example used for braking or to tilt the dump body. It will be understood by those skilled in the art that the actuator mechanism 18 is not limited to an air-operated pneumatic cylinder as illustrated, but could be a hydraulic cylinder, or an electric motor, or some other known type of controllable actuator with sufficient power and efficiency to be driven by an onboard source of power on the dump truck 10 to raise and lower apron 16. While a powered actuator mechanism such as 18 is greatly preferred, it is possible to provide a manual actuator, for example a lever or handle connected directly or through a linkage to apron 16, either as the sole tilt-actuator for the apron, or as a backup to the powered actuator 18. For example, curved slots 16d shown in some of the Figures could serve this function.

Linkage 20 is preferred for its mechanical advantage in translating the straight-line reciprocal movement of the air cylinder's actuator arm 18a into pivotal movement of apron 16 on its hinge. In the illustrated embodiment, linkage 20 includes a first link 22 in the form of a rectangular link arm formed from steel bar or plate, pivotally connected to the end of actuator arm 18a by a pin 21; a second longer link arm 24, also formed from rectangular steel bar or plate, pivotally connected to link 22 with a pin 23; and a third link arm 26 in the form of a cylindrical steel shaft, pivotally connected at one end to link 24 with a pin 25a, and pivotally connected at its other end to the apron sidewall 16b with a split yoke 26b pivotally mounted via pin 25b to a protruding ear 25c welded or otherwise formed on sidewall 16b. Link arms 22 and 24 are shown provided with multiple mounting holes 22a and 24a for their respective pivot pins, allowing the linkage to be adjusted to better accommodate different mounting locations on different dump truck sizes or models, and/or to conveniently adjust the range of motion of apron 16.

Those skilled in the art will understand that, while a multipart linkage as shown is mechanically advantageous, a direct operating connection between actuator 18 and apron 16 is also possible.

While the extent of motion of actuator arms 18a and the corresponding extension and contraction of linkages 20 are the primary determinant of the range of motion of apron 16, it is preferred to further limit the down-most position of apron 16 with one or more positive stops, such as 30 located on the lower inner corners of the apron sidewalls 16b and extending inwardly to contact an undersurface of the dump truck frame 11 or dump body 12 (such as the lower rear edges or corners of dump body sidewalls 12b). Stops 30 can reduce stress on actuators 18 and linkages 20, provide a more positive stop for apron 16, and provide a backup stop for the apron in case one or both linkages 20 were to fail. In the illustrated embodiment, stops 30 are generally L-shaped steel brackets whose horizontal lower legs extend inwardly under the bottom edges of sidewalls 16b, and which are set at an angle designed to engage the dump body/frame when the apron is in the flow-channeling position of FIGS. 1 and 2. An alternate form of stop is shown in FIG. 1 as short pins or studs (unnumbered, illustrated in phantom in FIG. 1) projecting from dump body end beams 12e and riding in arcuate slots 16d in the apron sidewalls.

Actuators 18 are preferably covered with plates or similar covers such as 19 (shown in FIG. 3, partially cut away) to protect them from environmental hazards such as dust, salt, and water, and also to protect them from being hit with damaging objects. Actuator 18 could also be mounted in a removable housing or module, for example a box-like rectangular frame including cover 19, sized and shaped to be conveniently mated with structural features of particular dump trucks, for example with the rectangular "pockets" 113 defined between the reinforcing beam structure 112b of dump body sidewalls 12b.

Figure 7:
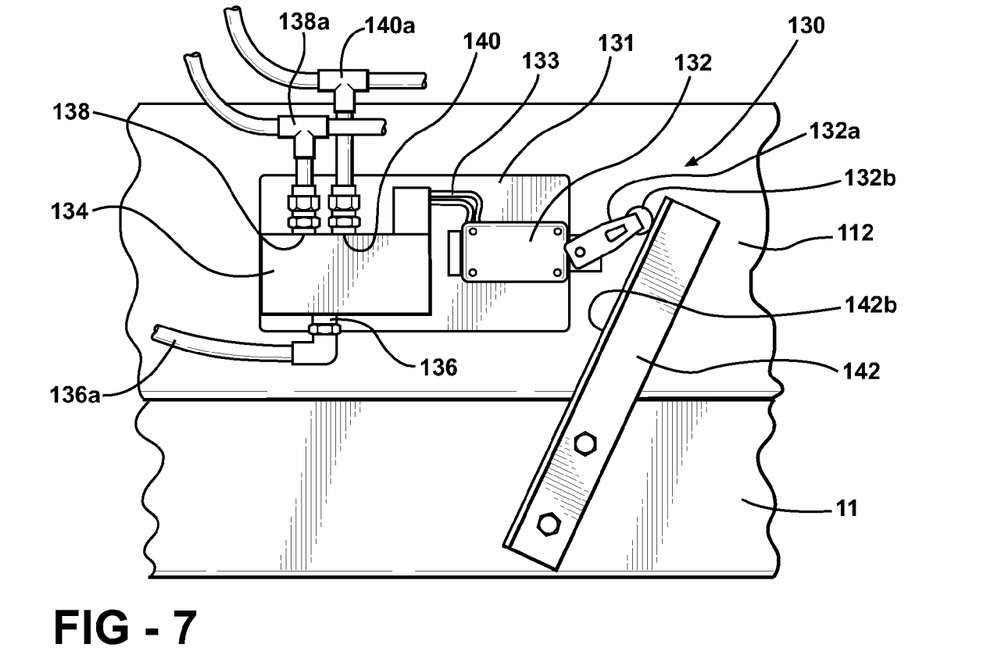
FIG. 7 is a side elevation view of a preferred switch mechanism for operating the apron actuator in response to dump body position, with the dump body in the horizontal transport position.
Figure 7A:
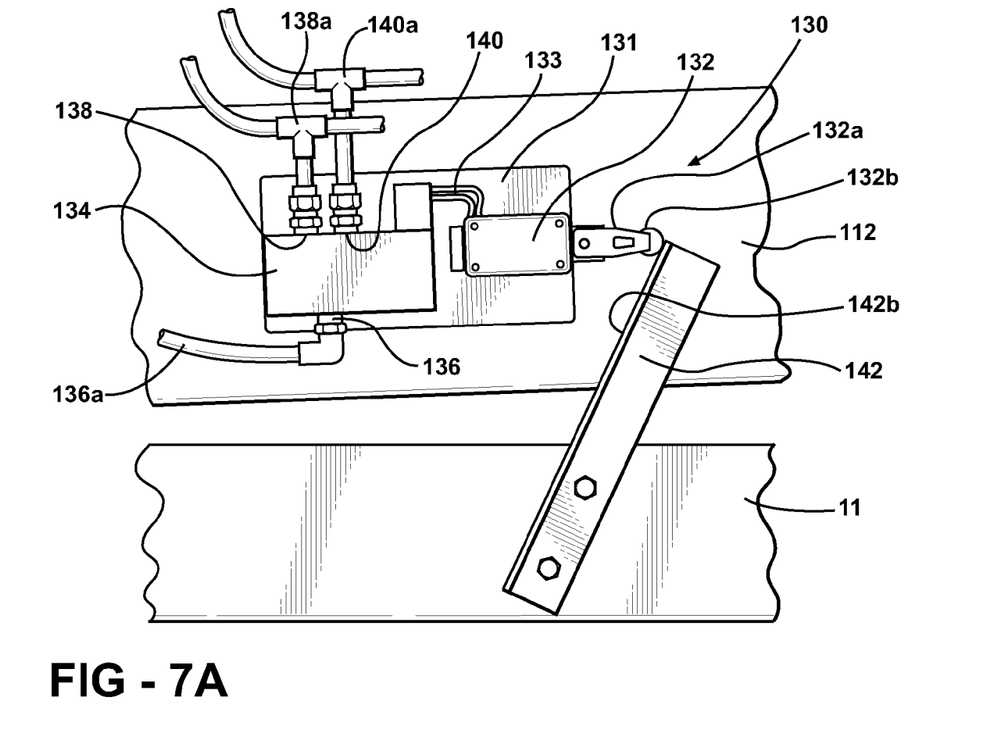
FIG. 7A is similar to FIG. 7, but with the dump body tilted for dumping, and the switch mechanism activated to lower the apron.

FIGS. 7 and 7A show a preferred switch mechanism 130 for controlling the operation of actuators 18 in response to the tilt position of dump bed 12 on the truck frame 11. Illustrated switch mechanism 130 includes a base plate 131 secured to a frame portion 112 of tiltable dump bed 12, a micro-switch 132 of known type mounted on the base plate 131 to move with dump bed 12, and an electrically operated four-way solenoid air-valve assembly 134 of known, commercially available type secured to base plate 131 and connected to receive switching signals from micro-switch 132 via wiring 133. Valve assembly 134 has a first intake port 136 receiving pressurized air from an onboard source via hose 136a, and two output ports 138 and 140, respectively connected via hoses 138a and 140a to the actuator units 18 on the sides of the dump truck, one port operating to extend the air cylinder arms 18a and lower the apron 16, the other port operating to retract the air cylinder arms 18a to raise apron 16. Valve assembly 134 also includes a pair of exhaust ports (not shown, but known to those skilled in the art) for venting air exhausted from the air cylinders via lines 138a and 140a.

Micro-switch 132 is normally biased to an "on" or closed-contact state, for example by a built-in spring bias tending to put its pivoting switch arm 132a in the position of FIG. 7A. Micro-switch 132 is operated in response to movement of dump bed 12 and its frame 112 by an angled switch actuator 142 fixed to the truck frame 11. Switch actuator 142 is illustrated as a ramp-like bar or beam set at an angle and location to move normally-on switch 132 to its "off" position, and to keep it off, when the dump body 12 is in the non-dumping, generally horizontal transport position shown in FIG. 7. When dump body frame 112 begins to tilt off truck frame 11 as shown in FIG. 7A, the micro-switch arm's roller end 132b is lifted off the cam surface 142b of ramp 142, allowing the switch to move to its default "on" state, and shifting the position of the solenoid mechanism in valve assembly 134 to channel apron-lowering air to the actuator mechanisms 18 on the sides of the dump truck, for example via port 138 and hose 138a. When the dumping operation ends, and dump bed 12 returns to the non-dumping position of FIG. 7, micro-switch 132 is returned to its "off" state by contact with ramp 142, and the air cylinder operating arms 18a on the actuators 18 are retracted with pressurized air from valve port 140 to raise apron 16 to the tailgate-sealing position.

It will be understood that while an angled, ramp-like member 142 is illustrated for actuating switch 132 in response to dump bed movement, other forms and shapes of switch-actuator can be used. The default state of switch 132 can also vary from the example shown, and different known switches can be used.

It is preferred that both the extension and retraction of the air cylinder actuating arms 18a is positive, with pressurized air acting in both the cylinder-extending and cylinder-retracting modes, so that apron 16 is lowered and raised quickly in response to the start and finish of dumping operations. It will be understood by those skilled in the art, however, that different rates and types of up/down operation for apron 16 can be programmed into whatever controls and valving are chosen to operate actuators 18. The illustrated air-valve assembly with positive two-way action is the currently preferred arrangement.

Figure 8:
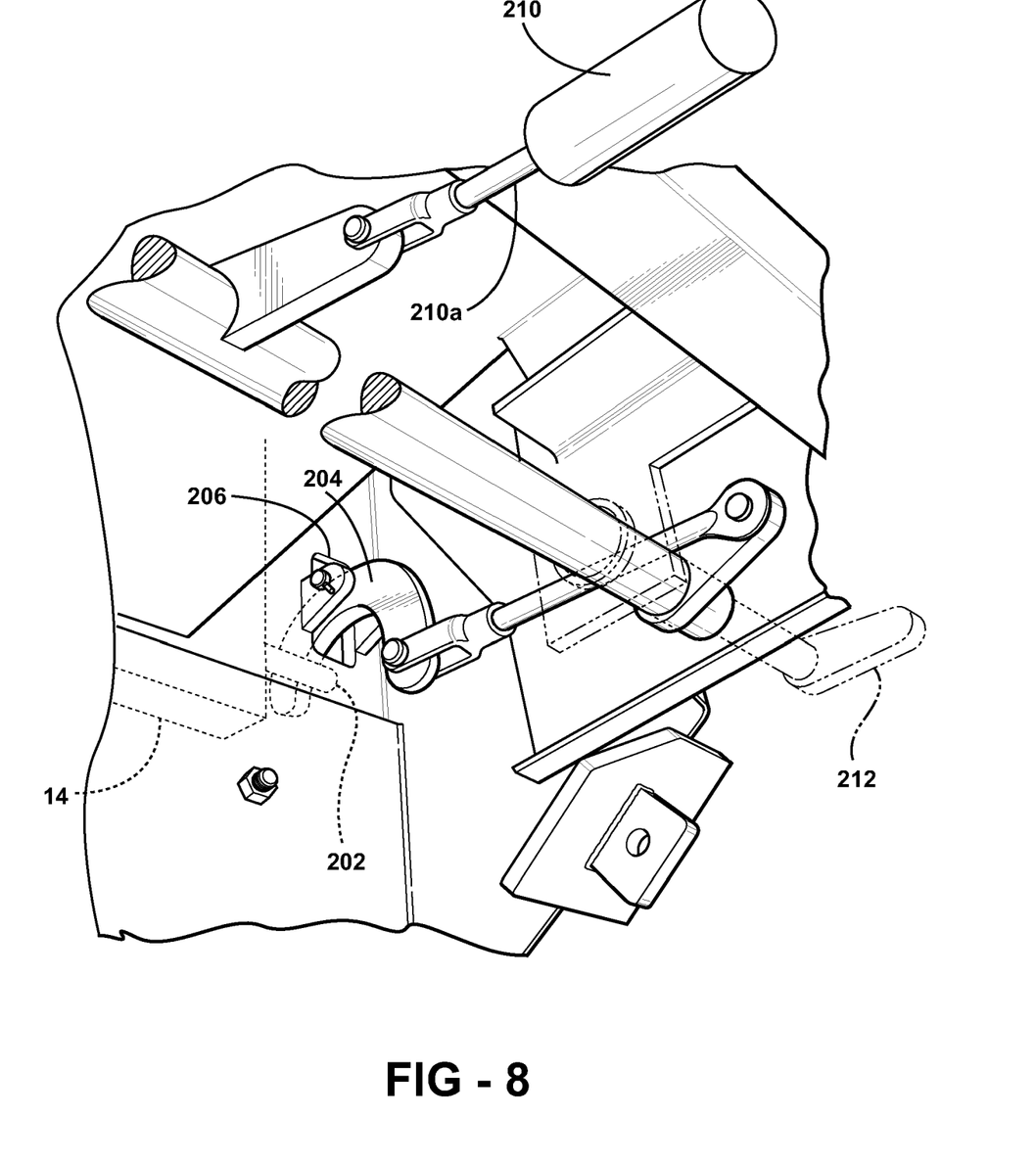
FIG. 8 is a perspective view from under the dump truck frame, illustrating a typical actuator mechanism for the tailgate's primary lock.

FIG. 8 shows one type of known actuator mechanism 200 for primary locking hooks 204 shown in the previous Figures. Hooks 204 are mounted to rotate simultaneously in and out of slots 206 formed in the dump body near the lower corners of tailgate 14. Hooks 204 are rotated by a shaft 208 extending cross-wise beneath the dump bed near the tailgate end, and can be driven by an air cylinder 210 similar to apron actuators 18. The cylinder 210 can be operated with a switch from inside the truck cab or on the exterior of the dump body. Hooks 204 could also be operated by rotating shaft 208 with a hand lever 212 located on the side of the dump body. Although the automatic, secondary locking function of apron 16 in response to the dump body position is a dependable and robust back-up to the primary lock 200, it would also be possible to power a primary lock-actuating cylinder such as 210 with its own switching and air-valve mechanism similar to 130 shown in FIGS. 7 and 7A, using the same truck-based supply of air pressure and similarly responsive to the position of dump body 12, for further security and peace of mind.

It will finally be understood that the disclosed embodiments are representative of presently preferred forms of the invention, but are intended to be illustrative rather than definitive of the invention. Reasonable variation and modification are possible within the scope of the foregoing disclosure and drawings without departing from the spirit of the invention.

What is claimed is:

1. A tailgate securing mechanism for an end-discharging truck of the type including a container body with a discharge opening and a tailgate closing the discharge opening, the tailgate being movable between a closed position retaining a load of particulate material in the container body and an open position to allow a load of particulate material to be discharged through the opening, comprising:

a flow-channeling apron pivotally mounted around a lower portion of the discharge opening, the apron movable between a lowered flow-channeling position and a raised tailgate-securing position in operative contact with a lower portion of the tailgate and overlying the lower portion of the discharge opening when the tailgate is in the closed position.

2. The tailgate securing mechanism of claim 1, wherein the apron maintains a sealing fit relative to floor and sidewall portions of the discharge opening when the tailgate is in the closed position to seal leaks of particulate material from between lower end of the discharge opening and the tailgate when the tailgate is in the closed position.

3. The tailgate securing mechanism of claim 2, wherein the apron is connected to the container body with a continuous hinge that seals a junction between the floor portion of the discharge opening and bottom of the apron.

4. The tailgate securing mechanism of claim 1, wherein the apron comprises sidewalls which have a sliding contact fit with exterior side portions of the container body for a sealing fit with the side portions of the container body.

5. The tailgate securing mechanism of claim 1, further comprising an actuator coupled to a switch responsive to the container body for automatically raising and lowering the apron between its flow-channeling and tailgate-securing positions in response to a tilt position of the container body.

6. The tailgate securing mechanism of claim 1, further including one or more stop members on an outer face of the tailgate, the stop members being contacted by an inner face of the apron in the tailgate-securing position.

7. The tailgate securing mechanism of claim 1, wherein the apron is angled away from the tailgate in the raised tailgate-securing position to define a containment volume between the apron and the tailgate when the tailgate is closed.

8. The tailgate securing mechanism of claim 1, wherein the tailgate comprises one or more stop members extending from an outer face of the tailgate to contact an inner face of the apron in the tailgate-securing position.

* * * * *